Jan. 28, 1930.　　　N. H. NORRIS　　　1,745,309

MILKING MACHINE

Filed Sept. 7, 1926

INVENTOR
NELSON. H. NORRIS.
BY *Fetherstonhaugh & Co.*
ATT'YS.

Patented Jan. 28, 1930

1,745,309

UNITED STATES PATENT OFFICE

NELSON HOWARD NORRIS, OF BATH, NEW YORK

MILKING MACHINE

Application filed September 7, 1926. Serial No. 134,050.

This invention relates to improvements in milking machines and more particularly to improvements in automatic vacuum control and over-flow valves.

The objects of the invention are to provide an automatic vacuum control and overflow valve which when attached to the vacuum lines or a trap on the vacuum line will check the flow of the liquid beyond the trap and to the source of vacuum.

A further object is to provide improved means of this description for the purpose of preventing a complete loss of vacuum when there is a sudden admission of free air to the vacuum line.

In the construction of milking machines vacuum pumps are used to create vacuum and thus extract the milk from the source of supply by the aid of tubes or pipes leading from the vacuum pumps to the udder. The milk which flows from the udder is generally trapped into a vessel or receptacle placed at some position between the source of supply and the pump, the vessel acting as a trap.

In other instances a milk trap is introduced on the vacuum line which permits the milk to collect within and discharge into a vessel or container.

In order that the milk may be arrested and collected in a trap, a mechanical means is provided whereby the traps are emptied of their contents before the trap is full of liquid, otherwise the liquids would flow on through the trap and go back to the source of vacuum.

The present invention relates to an automatic control and over-flow valve placed on the vacuum line or in the milk trap as described in the present specification and illustrated in the accompanying drawings the essential feature of which are the combination with a vacuum line of a partially balanced check valve intermediately arranged on said line adapted to be operated by air whereby the loss of vacuum is checked when the line is opened to admit air.

Referring now to the drawings in which like characters of reference indicate corresponding parts in each figure Figure 1 is a sectional elevation of a milk trap fitted with my improved automatic check valve.

Figure 1:
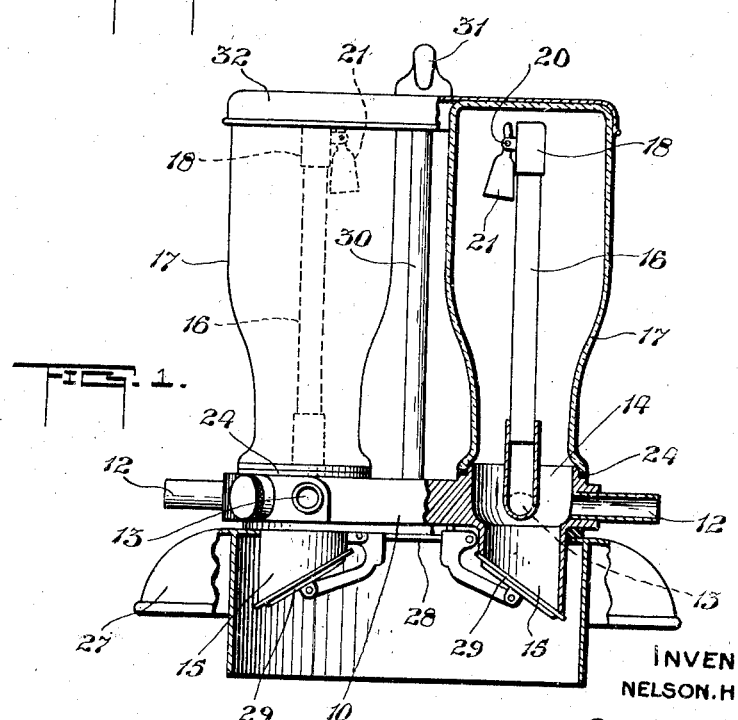

In the drawings 10 designates the base plate of the milk trap provided with hollow protruding nipples 12 adapted to be engaged in well known manner by flexible tubes connected to teat cups (not shown). Extending through the plate 10 are the suction pipe openings 13 while 14 are discharge openings communicating with the discharge pipe 15. The suction openings 13 through channels in the plate 10 communicate with the upright pipes 16 over which fit inverted milk bottles 17, as illustrated in Figure 1. Also communicating with the openings 14 are the nipple members 12.

Coming now to the essential feature of my invention this identified with the upright pipes 16 and comprises a cap member 18 provided with an orifice 19 and having pivotally mounted thereon as at 20 the valve member 21 interiorly hollow and cone-shaped as indicated at 22, and formed at its upper end with a flat sealing valve 23 adapted to open and close the orifice 19.

From the foregoing it will be seen that the suction and discharge means are so arranged in the supporting plate or base 10 that the milk bottles 17 form the trap and that the connection between the milk bottle openings and the openings 14 are made leak-proof by a rubber collar or the like 24. On the vacuum being created it is transmitted through the upright pipes 16 and the nipples 12 to the teat cups (not shown). The liquid then rushes in and is permitted to rise in the bottles 17 while the vacuum is on and the flow forthcoming. The automatic valve 21 is partially balanced and is operated by the admission of air to the vacuum chamber pipe line or trap. It is so constructed that when placed as here shown within the milk trap liquid will be admitted to the trap to a certain level, the valve automatically closing the orifice 19 in the cap 18, and is there retained by vacuum completely sealing the vacuum line extended beyond the valve while at the same time, preventing an over-flow in the vacuum line and thereon to the source of vacuum.

This automatic check valve is also a regulator and is so balanced that when the vacuum is created or the air is exhausted from the pipe lines or from the trap too rapidly it will in escaping through the valve close it and thus regulate the speed at which the vacuum is obtained. In the case of milking machines especially it is well known that it is not advisable to apply vacuum at too great a speed. A gradual application of vacuum is preferable as automatically effected by my improved check valve regulating the vacuum when the milk ceases to flow.

My improved check valve not only prevents the sudden application of vacuum at a specific pressure but regulates it to a gradual application.

Figure 3:
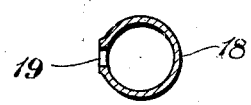
Figure 3 is a section on the line 3—3 of Figure 2.
Figure 2:
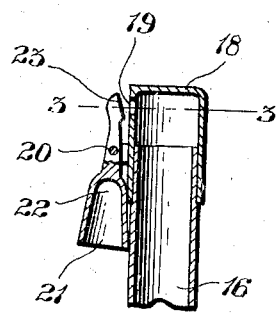
Figure 2 is a sectional detail of the vacuum line with valve attached.
Figure 4:
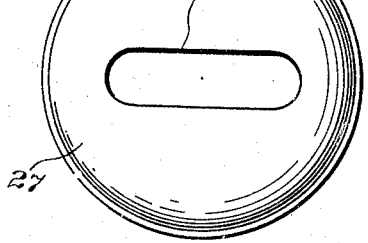
Figure 4 is a plan view of a milk can cover of a design adapted to the present device.

Another feature of my invention, as illustrated in Figures 1 and 4, is the cover 27 of an ordinary milk can provided with an enlarged slot or opening 28 through which extends the discharge pipes 15 provided with valves 29 of well known construction. The plate 10 is also provided with a center rod 30 on which is a wing nut 31 adapted to hold the cover 32 of the inverted milk bottles 17 securely in position. This wing nut also provides means for suspending the trap. The combination of the slotted milk can cover with the trap as a whole forms an important part of my invention.

From the foregoing it will be noted that the partially balanced or pivotally mounted check valve 21 fluid operated and arranged to open and close the air opening in the trap, the latter being located between the vacuum pumps and the teat cups, will be automatically operated by the admission of free air as in the case of applying teat cups to the cow's udder. Furthermore this valve will check the flow of milk as it flows into the traps and prevent any over-flow from the milk trap to the vacuum line beyond the trap. The vacuum being constantly on the cow's udder while all teat cups are being attached thereto if permitted the milk would flow into the vacuum pumps and fill the trap. My automatic check valve efficiently prevents this.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In a milking machine the combination with a milk trap having an air opening therein of a pivotally mounted check valve adapted under the influence of air or liquid to automatically operate to open and close the air orifice.

2. In a milking machine, a milk trap, a fluid operable automatic check valve for the trap, air intake means in the trap adapted to be automatically opened and closed by said valve and adapted to be automatically operated by the admission of free air, said valve being also adapted to check the flow of liquid to the vacuum lines beyond the trap.

3. The combination with a source of liquid supply and a vacuum pump communicating, a trap intermediately arranged therebetween, an air vent in said trap, a valve pivotally mounted adjacent said vent and normally out of engagement therewith adapted under the influence of air suction to automatically close the air vent and cut off the vacuum, float means integral with said valve whereby on a predetermined level of liquid being reached within the trap the valve is also automatically operated to close the air intake, and whereby on the air suction through the vent receding below a predetermined force and the liquid within the trap receding below a predetermined level respectively the valve automatically operates to open the air vent.

4. In milking machines and the like and in combination, a milk trap, a pivotally mounted control valve balanced in said trap and operable under the influence of air suction or air exhaust within the trap and further automatically operable on the liquid within the trap reaching a predetermined point.

5. In milking machines and the like and in combination, a milk trap, a counter balanced pivotally mounted control valve balanced under normal conditions in open position within the trap and automatically operable to closed position on the milk ceasing to flow.

In witness whereof I have hereunto set my hand.

NELSON HOWARD NORRIS.